United States Patent
Su et al.

(10) Patent No.: US 8,199,254 B2
(45) Date of Patent: Jun. 12, 2012

(54) DEVICE FOR SEPARATING SYNCHRONOUS SIGNAL AND METHOD THEREOF

(75) Inventors: Tsung-Yi Su, Sinshih Township, Tainan County (TW); Kuo-Chan Huang, Sinshih Township, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1321 days.

(21) Appl. No.: 11/896,216

(22) Filed: Aug. 30, 2007

(65) Prior Publication Data

US 2008/0252783 A1    Oct. 16, 2008

(30) Foreign Application Priority Data

Apr. 12, 2007  (TW) .............................. 96112942 A

(51) Int. Cl.
| | |
|---|---|
| H04N 5/06 | (2006.01) |
| H04N 9/45 | (2006.01) |
| H04N 9/455 | (2006.01) |
| H04N 5/067 | (2006.01) |
| H04N 5/08 | (2006.01) |

(52) U.S. Cl. ......... 348/525; 348/521; 348/522; 348/526
(58) Field of Classification Search ........... 348/500–526
See application file for complete search history.

(56) References Cited

U.S. PATENT DOCUMENTS

| | | | | |
|---|---|---|---|---|
| 5,805,150 A | * | 9/1998 | Nishino et al. | 345/213 |
| 5,949,827 A | * | 9/1999 | DeLuca et al. | 375/324 |
| 7,158,068 B2 | * | 1/2007 | Kobayashi et al. | 341/155 |
| 7,301,410 B2 | * | 11/2007 | Rhee et al. | 331/57 |
| 7,940,335 B2 | * | 5/2011 | Takama et al. | 348/691 |
| 2006/0043956 A1 | * | 3/2006 | Clavette | 323/288 |

* cited by examiner

*Primary Examiner* — Kristine Kincaid
*Assistant Examiner* — Gigi L Dunasky
(74) *Attorney, Agent, or Firm* — Rabin & Berdo, P.C.

(57) ABSTRACT

In a device for separating a synchronous signal in a video signal, a capacitor receives the video signal to obtain a coupling signal, a level determining circuit receives the coupling signal and compares a voltage level of the coupling signal with a number of reference voltages. The reference voltages define several reference voltage ranges, one of which is a predetermined reference voltage range. The level determining circuit outputs an adjusting signal according to a reference voltage range corresponding to a minimum voltage level of the coupling signal within a predetermined time period. A level adjusting circuit has several current sources for receiving the adjusting signal and thus controls the current sources to adjust a DC level of the coupling signal. A synchronous signal separating circuit separates the synchronous signal from the coupling signal when the minimum voltage level of the coupling signal is substantially within the predetermined reference voltage range.

15 Claims, 5 Drawing Sheets

DEVICE FOR SEPARATING SYNCHRONOUS SIGNAL AND METHOD THEREOF

This application claims the benefit of Taiwan application Serial No. 96112942, filed Apr. 12, 2007, the subject matter of which is incorporated herein by reference.

BACKGROUND OF THE INVENTION

1. Field of the Invention

The invention relates to a device for separating a synchronous signal in a signal and a method thereof, and more particularly to a device for separating a synchronous signal in a video signal and a method thereof.

2. Description of the Related Art

FIG. 1 (Prior Art) shows a waveform of a video signal. Referring to FIG. 1, the video signal includes a synchronous signal SYNC and a data signal Data. The data signal Data and the synchronous signal SYNC has different level ranges. Usually, the voltage value that may be possessed by the data signal Data is greater than the voltage value of the synchronous signal SYNC. A receiver for receiving the video signal must first separate the synchronous signal SYNC from the video signal and then further generates a pixel clock according to the frequency of the synchronous signal SYNC and processes the video signal.

When the video signal is being transmitted, a DC level of an output of a transmitter is frequently different from a DC level received by the receiver. Consequently, the video signal received by the receiver may exceed a voltage range within which the receiver may operate normally. Thus, AC coupling is first performed according to the received video signal in order to separate the DC voltage from the video signal in the conventional synchronous video separating device. Next, a video clamping circuit is utilized to clamp the DC voltage level of the coupled video signal to the required voltage value. Then, a synchronous video separating device separates the synchronous signal SYNC in the video signal using a comparator according to a reference voltage because the synchronous signal SYNC and the data signal Data of the video signal have different level ranges.

However, an analog circuit is adopted to fix the AC-coupled video signal in the conventional video clamping circuit. The requirement of the analog circuit on the precision of the parameter is high, so the phenomena of the DC level fluctuation and the circuit bandwidth drift tend to occur under the interference of the factor of the IC manufacturing processes. The bandwidth of the circuit restricts the frequency range that can be processed by the synchronous signal SYNC. In addition, the utilization of the analog circuit tends to cause the problem of the unstable circuit, thereby increasing the complexity in design. Thus, it is a subject of the invention to solve the problem of the unstable circuit by effectively enlarging the frequency range of the video signal, which may be processed by the synchronous video separating device.

SUMMARY OF THE INVENTION

The invention is directed to a device for separating a synchronous signal in a signal and a method thereof in order to solve the problem of an unstable clamping circuit and to process video signals with different frequency ranges effectively.

According to a first aspect of the present invention, a device for separating a synchronous signal in a video signal is provided. The device receives the video signal including the synchronous signal and a data signal. The data signal and the synchronous signal have different level ranges. The device includes a capacitor, a level determining circuit, a level adjusting circuit and a synchronous signal separating circuit. The capacitor receives the video signal and performs AC coupling according to the video signal to obtain a coupling signal. The level determining circuit receives the coupling signal and compares a voltage level of the coupling signal with several reference voltages. The reference voltages define several reference voltage ranges, one of which is a predetermined reference voltage range. The level determining circuit outputs an adjusting signal according to the reference voltage range corresponding to a minimum voltage level of the coupling signal in a predetermined time period. The level adjusting circuit has several current sources and receives the adjusting signal and thus controls the current sources to adjust a DC level of the coupling signal until the minimum voltage level of the coupling signal is substantially within the predetermined reference voltage range. The synchronous signal separating circuit separates the synchronous signal from the coupling signal according to a separating reference voltage when the minimum voltage level of the coupling signal is substantially within the predetermined reference voltage range. The separating reference voltage neighbors the predetermined reference voltage range.

According to a second aspect of the present invention, a method of separating a video signal in a synchronous signal is provided. The method is adapted to a display device, which receives the video signal comprising the synchronous signal and a data signal. The data signal and the synchronous signal have different level ranges. The method includes the following steps. First, AC coupling is performed according to the video signal to obtain a coupling signal. Second, a voltage level of the coupling signal is compared with a plurality of reference voltages defining a plurality of reference voltage ranges, one of which is a predetermined reference voltage range. Third, an adjusting signal is generated according to the reference voltage range corresponding to a minimum voltage level of the coupling signal in a predetermined time period. Fourth, a DC level of the coupling signal is adjusted according to the adjusting signal until the minimum voltage level of the coupling signal is substantially within the predetermined reference voltage range. Finally, the synchronous signal is separated from the coupling signal according to a separating reference voltage when the minimum voltage level of the coupling signal is substantially within the predetermined reference voltage range.

The invention will become apparent from the following detailed description of the preferred but non-limiting embodiments. The following description is made with reference to the accompanying drawings.

DETAILED DESCRIPTION OF THE INVENTION

Figure 1:
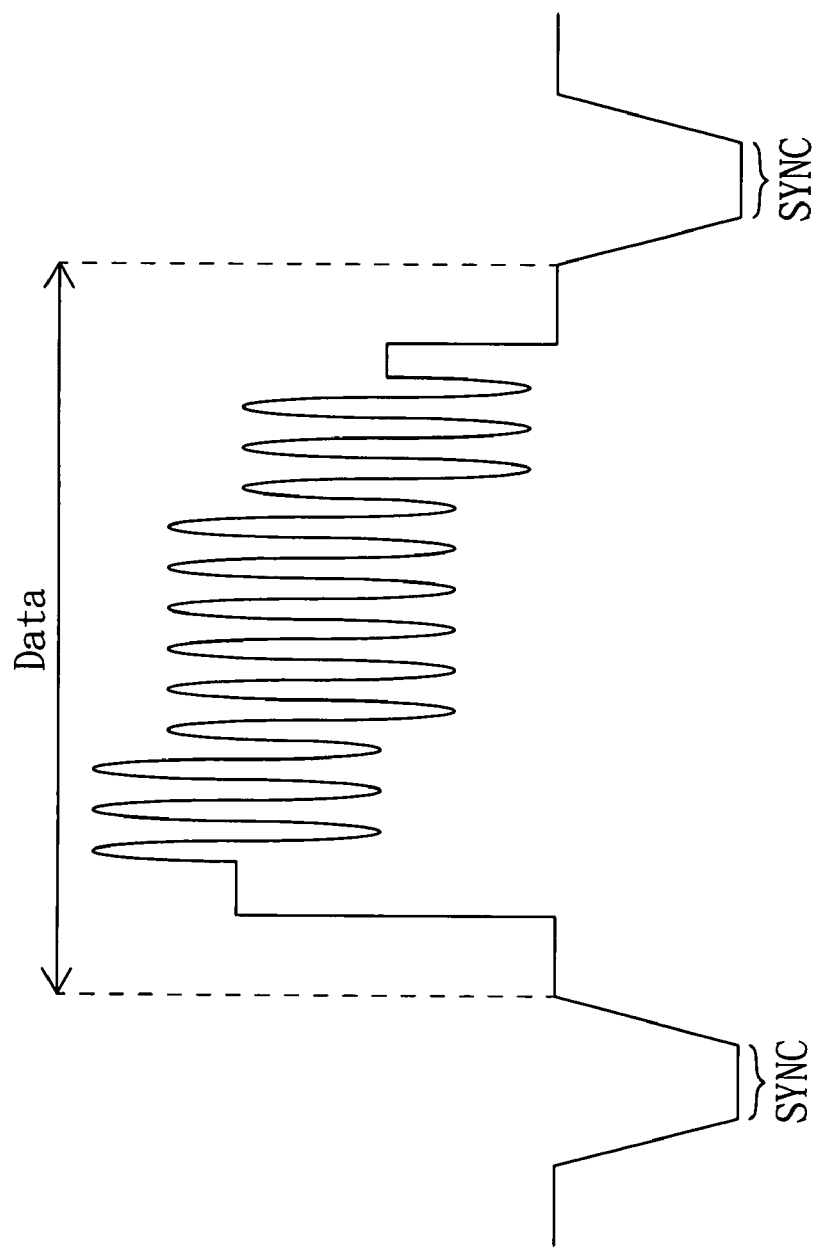
FIG. 1 (Prior Art) shows a waveform of a video signal.
Figure 2:
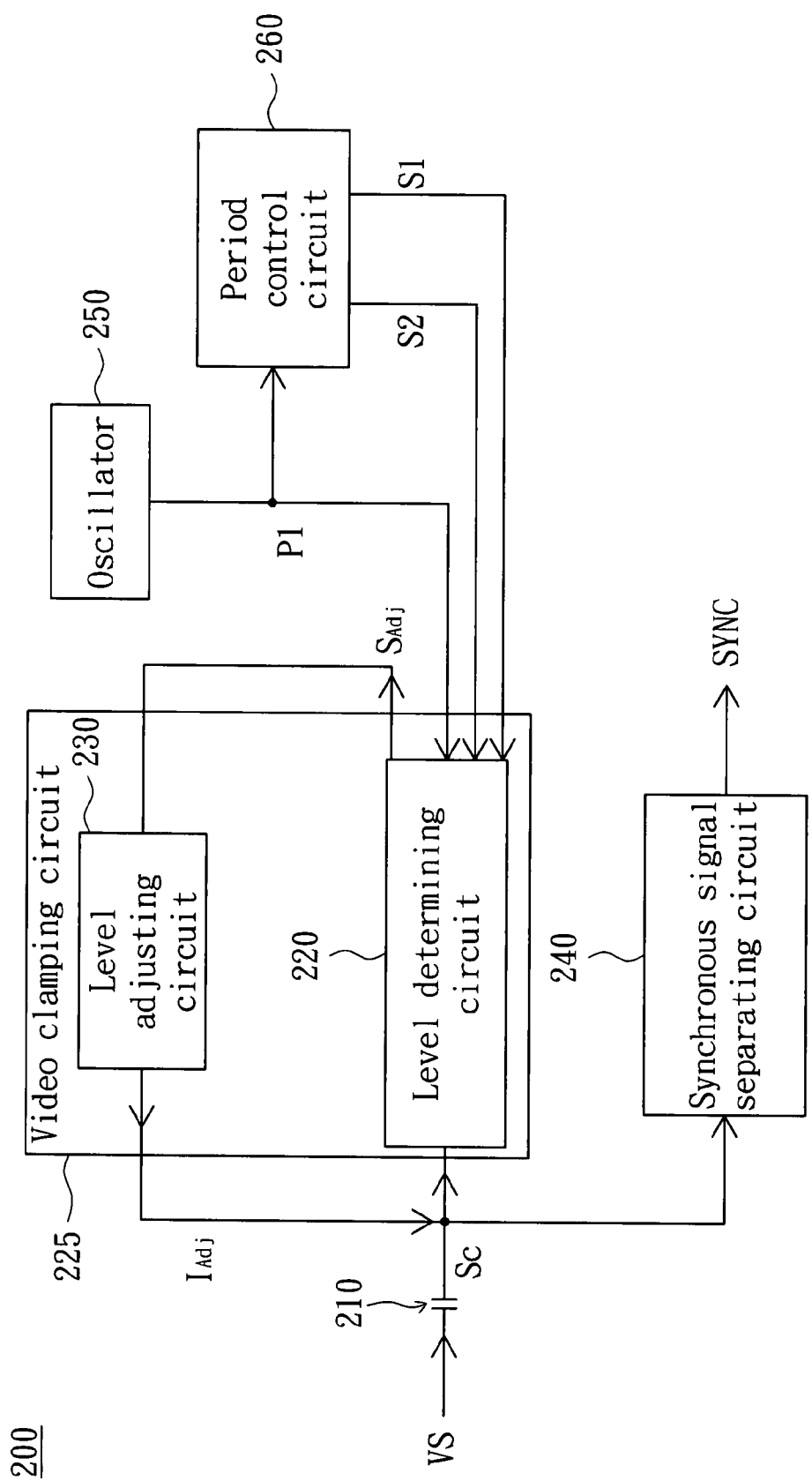
FIG. 2 is a block diagram showing a device for separating a synchronous signal in a video signal according to a preferred embodiment of the invention.

FIG. 2 is a block diagram showing a device 200 for separating a synchronous signal in a video signal according to a preferred embodiment of the invention. As shown in FIG. 2, the device 200 is disposed in a display device, such as a liquid crystal display, for receiving a video signal VS. The video signal VS includes a synchronous signal SYNC and a data signal Data, as shown in FIG. 1. The device 200 includes a capacitor 210, a video clamping circuit 225 and a synchronous signal separating circuit 240. The video clamping circuit 225 includes a level determining circuit 220 and a level adjusting circuit 230. The capacitor 210 receives the video signal VS and performs AC coupling according to the video signal VS to obtain a coupling signal $S_C$.

The level determining circuit 220 receives the coupling signal $S_C$ and compares a voltage level of the coupling signal $S_C$ with several reference voltages. The reference voltages define several reference voltage ranges, one of which is a predetermined reference voltage range. The level determining circuit 220 outputs an adjusting signal $S_{Adj}$ according to the reference voltage range corresponding to a minimum voltage level of the coupling signal in a predetermined time period.

The level adjusting circuit 230 has several current sources and receives the adjusting signal $S_{Adj}$ and thus controls the current sources to adjust a DC level of the coupling signal $S_C$ until the minimum voltage level of the coupling signal $S_C$ is substantially within the predetermined reference voltage range.

The synchronous signal separating circuit 240 separates the synchronous signal from the coupling signal $S_C$ according to a separating reference voltage when the minimum voltage level of the coupling signal $S_C$ is substantially within the predetermined reference voltage range. The separating reference voltage neighbors the predetermined reference voltage range.

Figure 3:
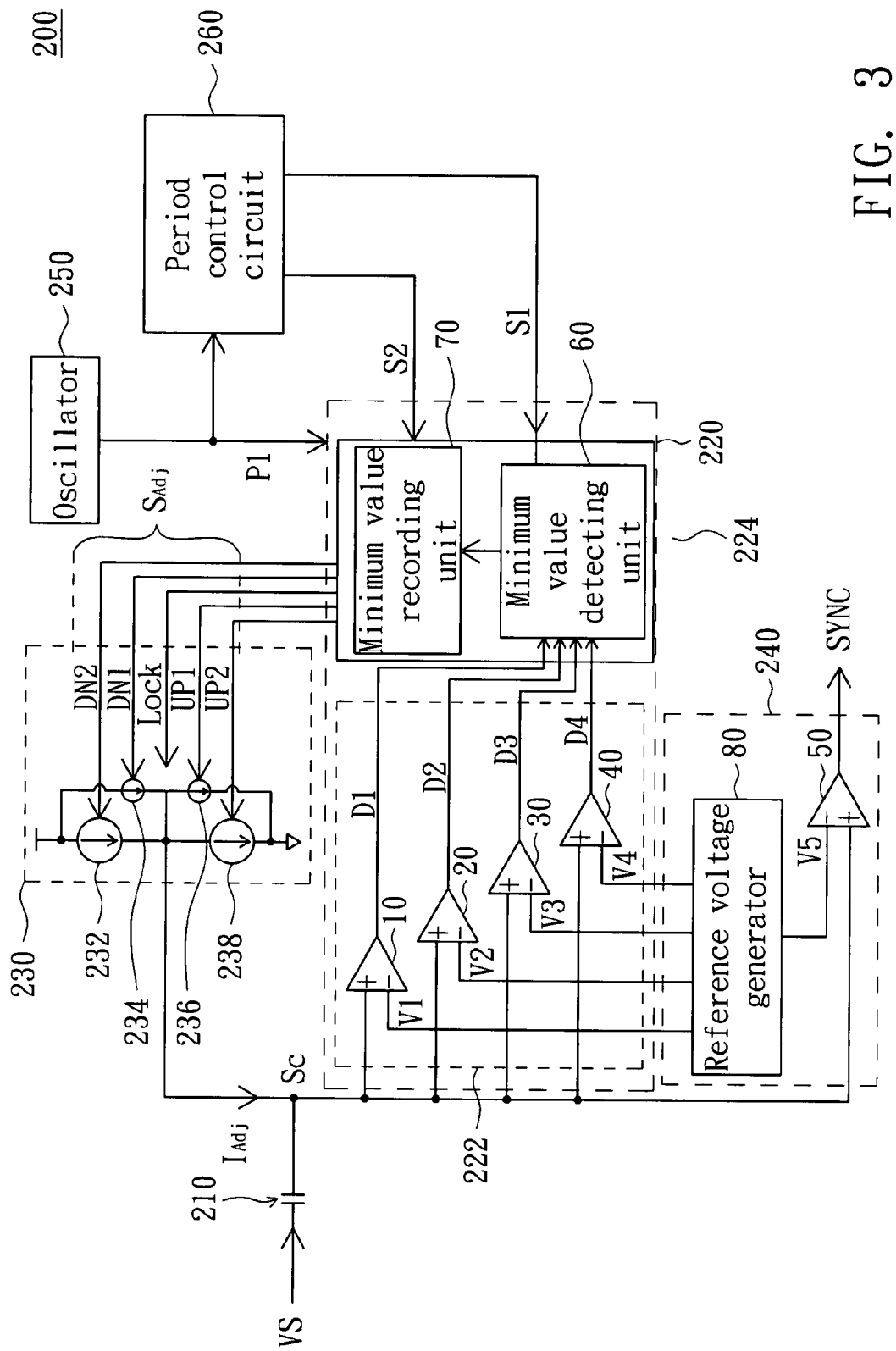
FIG. 3 is a detailed circuit diagram showing an example of the device for separating the synchronous signal in the video signal according to the preferred embodiment of the invention.

Illustrations regarding to how the device 200 judges whether the minimum voltage level of the coupling signal $S_C$ is within the predetermined reference voltage range will be made in the following. FIG. 3 is a detailed circuit diagram showing an example of the device for separating the synchronous signal in the video signal according to the preferred embodiment of the invention. Referring to FIG. 3, the level determining circuit 220 includes a comparing circuit 222 and a minimum value recorder 224. The comparing circuit 222 includes several comparators, such as a first comparator 10, a second comparator 20, a third comparator 30 and a fourth comparator 40. First terminals (e.g., the positive input terminals) of the comparators 10, 20, 30 and 40 respectively receive the coupling signal $S_C$. A second terminal (e.g., the negative input terminal) of the first comparator 10 receives a first reference voltage V1, and the first comparator 10 compares the first reference voltage V1 with the voltage level of the coupling signal $S_C$ to output a first indicating signal D1. A second terminal (e.g., the negative input terminal) of the second comparator 20 receives a second reference voltage V2, and the second comparator 20 compares the second reference voltage V2 with the voltage level of the coupling signal $S_C$ to output a second indicating signal D2. A second terminal (e.g., the negative input terminal) of the third comparator 30 receives a third reference voltage V3, and the third comparator 30 compares the third reference voltage V3 with the voltage level of the coupling signal $S_C$ to output a third indicating signal D3. A second terminal (e.g., the negative input terminal) of the fourth comparator 40 receives a fourth reference voltage V4, and the fourth comparator 40 compares the fourth reference voltage V4 with the voltage level of the coupling signal $S_C$ to output a fourth indicating signal D4. In this case, V1>V2>V3>V4.

Figure 4:
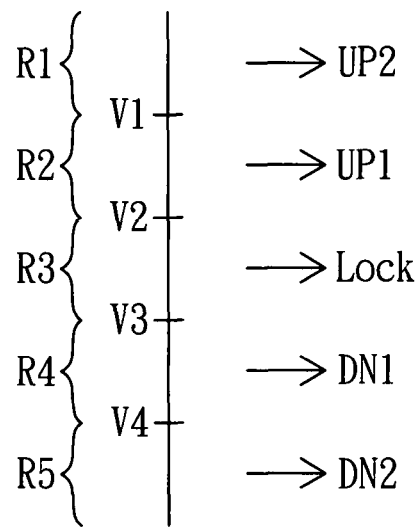
FIG. 4 shows relationships between reference voltages V1 to V4 and an adjusting signal $S_{Adj}$ according to the preferred embodiment of the invention.

FIG. 4 shows relationships between the reference voltages V1 to V4 and the adjusting signal $S_{Adj}$ according to the preferred embodiment of the invention. Referring to FIG. 4, the reference voltages V1 to V4 define several reference voltage ranges R1 to R5. The reference voltage range R1 is a range in which the voltage is greater than V1, the reference voltage range R2 is a range in which the voltage ranges from V1 to V2, the reference voltage range R3 is a range in which the voltage ranges from V2 to V3, the reference voltage range R4 is a range in which the voltage ranges from V3 to V4, and the reference voltage range R5 is a range in which the voltage is smaller than V4.

Referring to FIG. 3, the minimum value recorder 224 includes a minimum value detecting unit 60 and a minimum value recording unit 70. The minimum value detecting unit 60 receives the first indicating signal D1, the second indicating signal D2, the third indicating signal D3 and the fourth indicating signal D4 and judges the reference voltage range corresponding to the voltage level of the coupling signal $S_C$. The minimum value recording unit 70 records the reference voltage range corresponding to the minimum voltage level of the coupling signal $S_C$ in the predetermined time period, and thus outputs the adjusting signal $S_{Adj}$. The predetermined reference voltage range may be the reference voltage range R3, for example.

Referring to FIG. 4, the adjusting signal $S_{Adj}$ includes a first discharge signal UP2, a second discharge signal UP1, a locking signal Lock, a first charge signal DN1 and a second charge signal DN2. When the voltage level of the coupling signal Sc is higher than the first reference voltage V1, the indicating signals D1 to D4 are enabled. When the voltage of the coupling signal Sc ranges from the first reference voltage V1 to the second reference voltage V2, the first indicating signal D1 is disabled and the indicating signals D2 to D4 are enabled. When the voltage of the coupling signal Sc ranges from the second reference voltage V2 to the third reference voltage V3, the indicating signals D1 and D2 are disabled and the indicating signals D3 and D4 are enabled. When the voltage of the coupling signal Sc ranges from the third reference voltage V3 to the fourth reference voltage V4, the indicating signals D1 to D3 are disabled and the fourth indicating signal D4 is enabled. When the voltage of the coupling signal Sc is lower than the fourth reference voltage V4, the indicating signals D1 to D4 are disabled.

Thus, the minimum value detecting unit 60 can obtain the reference voltage range, which is one of the reference voltage ranges R1 to R5, corresponding to the voltage level of the coupling signal $S_C$ according to states of the indicating signals D1 to D4. The minimum value detecting unit 60 extracts several reference voltage ranges corresponding to several voltages level of the coupling signal $S_C$ and finds out the reference voltage range with the minimum voltage to serve as the reference voltage range corresponding to the minimum voltage level of the coupling signal $S_C$ in the predetermined time period. For example, if the minimum value detecting unit 60 extracts ten reference voltage ranges R1, R2, R1, R2, R3; R4, R4, R3, R1 and R2 corresponding to the voltages of the coupling signal $S_C$ in the predetermined time period, the reference voltage range corresponding to the minimum voltage level of the coupling signal $S_C$ is R4 because the voltage falling within the reference voltage range R4 is the minimum of the voltages (higher than V4) falling within the ranges R1 to R4 in the range from V3 to V4.

When the reference voltage range corresponding to the minimum voltage level of the coupling signal $S_C$ is R1, the first discharge signal UP2 is enabled. When the reference voltage range corresponding to the minimum voltage level of the coupling signal $S_C$ is R2, the second discharge signal UP1 is enabled. When the reference voltage range corresponding to the minimum voltage level of the coupling signal $S_C$ is R3, the locking signal Lock is enabled. When the reference voltage range corresponding to the minimum voltage level of the coupling signal $S_C$ is R4, the first charge signal DN1 is enabled. When the reference voltage range corresponding to the minimum voltage level of the coupling signal $S_C$ is R5, the second charge signal DN2 is enabled.

Referring to FIG. 3, the level adjusting circuit 230 further includes a coarse-tuning charge current source 232, a fine-tuning charge current source 234, a fine-tuning discharge current source 236 and a coarse-tuning discharge current source 238. When the first discharge signal UP2 is enabled, the coarse-tuning discharge current source 238 is enabled to provide a first discharge current as an adjusting current $I_{Adj}$ to lower the DC level of the coupling signal $S_C$. When the second discharge signal UP1 is enabled, the fine-tuning discharge current source 236 is enabled to provide a second discharge current as the adjusting current $I_{Adj}$ to lower the DC level of the coupling signal $S_C$. When the first charge signal DN1 is enabled, the fine-tuning charge current source 234 is enabled to provide a first charging current as the adjusting current $I_{Adj}$ to increase the DC level of the coupling signal $S_C$. When the second charge signal DN2 is enabled, the coarse-tuning charge current source 232 is enabled to provide a second charging current as the adjusting current $I_{Adj}$ to increase the DC level of the coupling signal $S_C$. The absolute value of the second discharge current is smaller than the absolute value of the first discharge current, and the absolute value of the first charging current is substantially smaller than the absolute value of the second charging current.

When the minimum voltage level of the coupling signal $S_C$ is substantially out of the predetermined reference voltage range R3 (i.e., within the reference voltage range R1, R2, R4 or R5), the adjusting signal $S_{Adj}$ selectively enables one of the fine-tuning discharge current source 236, the fine-tuning charge current source 234, the coarse-tuning discharge current source 238 and the coarse-tuning charge current source 232 according to the reference voltage range corresponding to the minimum voltage level of the coupling signal $S_C$ to adjust the DC level of the coupling signal $S_C$.

When the minimum voltage level of the coupling signal $S_C$ is within the predetermined reference voltage range R3, the locking signal Lock is enabled, the device 200 is in a locked state, and the DC level of the coupling signal $S_C$ does not have to be adjusted. So, the adjusting signal $S_{Adj}$ disables the fine-tuning discharge current source 236, the fine-tuning charge current source 234, the coarse-tuning discharge current source 238 and the coarse-tuning charge current source 232, and the DC level of the coupling signal $S_C$ is substantially kept at the original level.

In addition, the synchronous signal separating circuit 240 includes a separating comparator 50 and a reference voltage generator 80. The separating comparator 50 compares the coupling signal $S_C$ with the separating reference voltage V5. When the device 200 is in the locked state, that is, when the minimum voltage level of the coupling signal $S_C$ is substantially within the predetermined reference voltage range R3, the separating comparator 50 separates the synchronous signal SYNC from the coupling signal $S_C$ according to the separating reference voltage V5 and outputs the synchronous signal SYNC. The separating reference voltage V5 neighbors the predetermined reference voltage range R3. In this embodiment, the separating reference voltage V5 is preferably higher than any voltage falling within the predetermined reference voltage range R3 (i.e., higher than the reference voltage V2). The reference voltage generator 80 provides the reference voltages V1 to V4 and the separating reference voltage V5.

Figure 5:
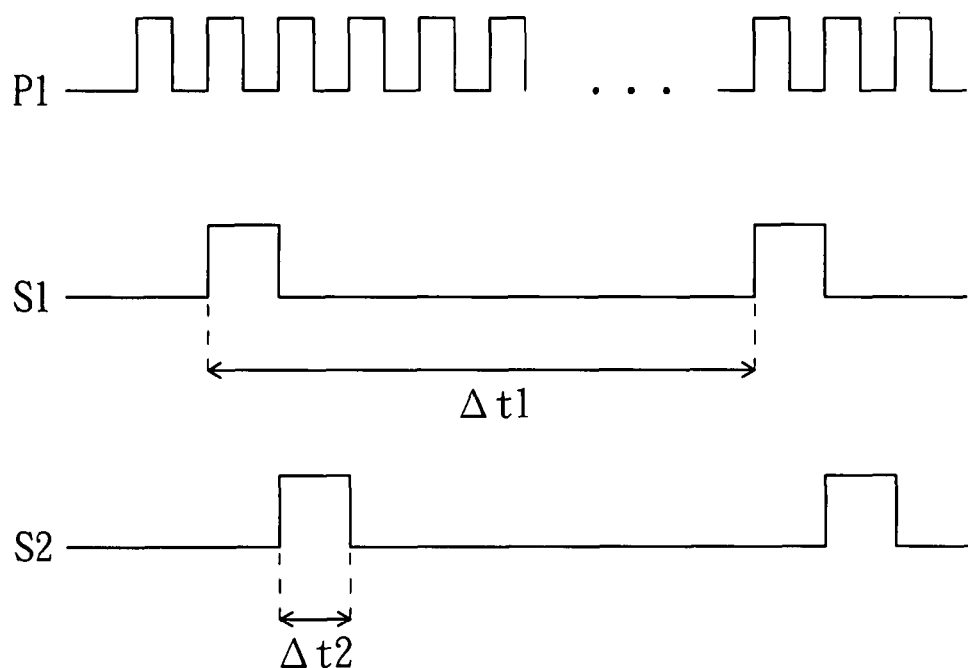
FIG. 5 shows timings of an operation control signal P1, a first period signal S1 and a second period signal S2 according to the preferred embodiment of the invention.

FIG. 5 shows timings of an operation control signal P1, a first period signal S1 and a second period signal S2 according to the preferred embodiment of the invention. Referring to FIG. 5, the device 200 further includes an oscillator 250 and a period control circuit 260. The oscillator 250 provides the operation control signal P1 required by the device 200. The period control circuit 260 receives the operation control signal P1 and down-samples the operation control signal P1 to generate the first period signal S1 and the second period signal S2. The first period signal S1 is transmitted to the minimum value detecting unit 60, and the second period signal S2 is transmitted to the minimum value recorder 224. The minimum value detecting unit 60 of the level determining circuit 220 judges the reference voltage range corresponding to the voltage level of the coupling signal $S_C$ according to the operation control signal P1. For example, the minimum value detecting unit 60 acquires the reference voltage range corresponding to the voltage level of the coupling signal $S_C$ at the rising edge of the control signal P1.

The minimum value detecting unit 60 of the level determining circuit 220 determines the predetermined time period according to the period of the first period signal S1. For example, the predetermined time period is the period $\Delta t_1$ of the first period signal S1. All reference voltage ranges obtained by the minimum value detecting unit 60 in the predetermined time period determine the reference voltage range corresponding to the minimum voltage level of the coupling signal $S_C$ at the rising edge of the first period signal S1.

The current sources 232, 234, 236 and 238 are enabled for time lengths determined according to the length of the enabling time of the second period signal S2. For example, if the second charge signal DN2 is enabled, the coarse-tuning charge current source 232 is enabled for the time length, which may be configured to be equal to $\Delta t_2$. That is, the coarse-tuning charge current source 232 is enabled when the second charge signal DN2 is enabled and the second period signal S2 is enabled. Consequently, enabling the current source only in $\Delta t_2$ can prevent the DC voltage level of the coupling signal $S_C$ from changing too rapidly to cause the device 200 to be unstable. Preferably, the frequency of each of the first period signal S1 and the second period signal S2 is lower than that of the synchronous signal SYNC.

Figure 6:
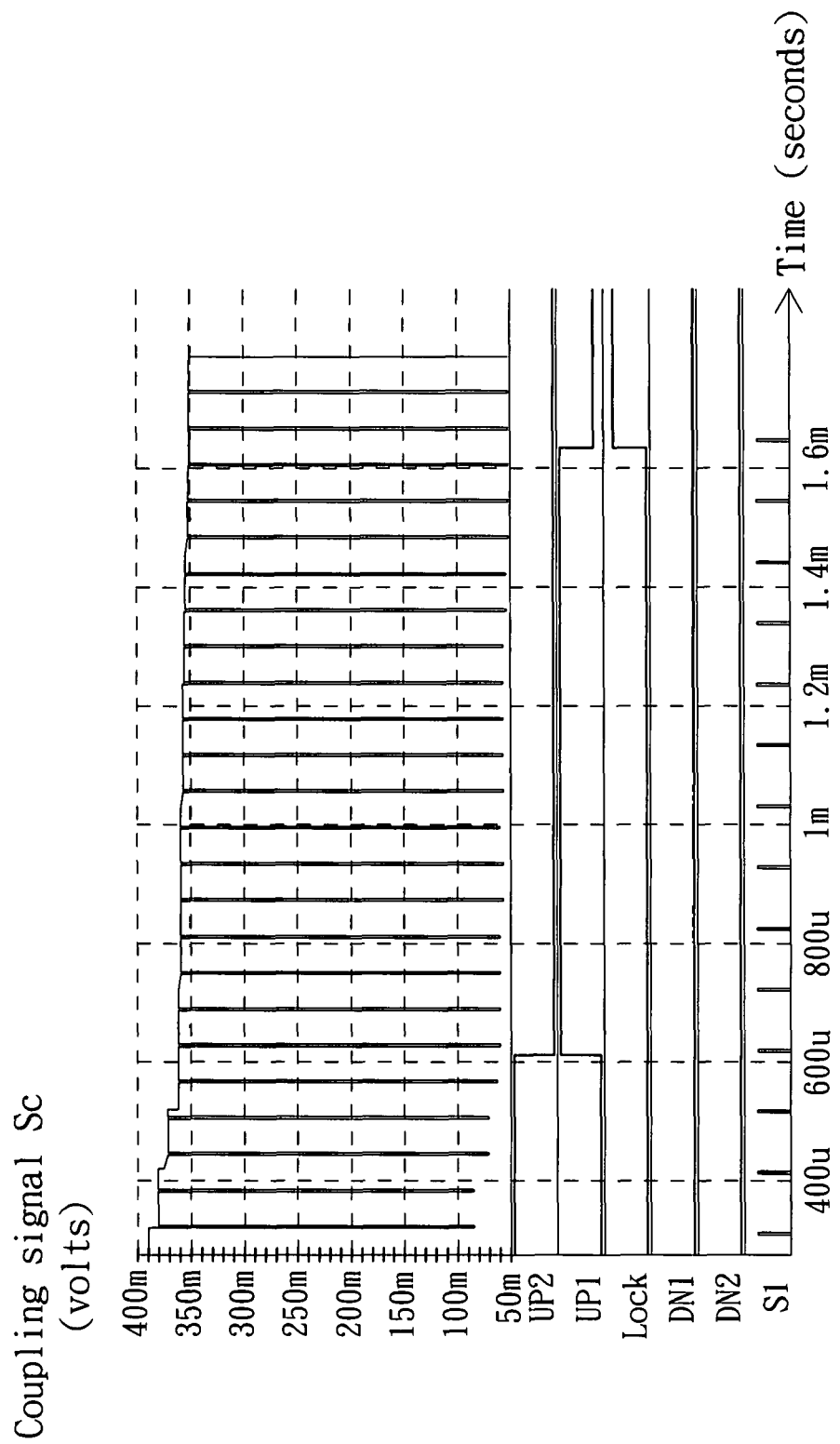
FIG. 6 shows a circuit simulation result of the device for separating the synchronous signal in the video signal according to the preferred embodiment of the invention.

FIG. 6 shows a circuit simulation result of the device for separating the synchronous signal in the video signal according to the preferred embodiment of the invention. As shown in FIG. 6, it is assumed that V1 is 60 mV, V2 is 55 mV, V3 is 50 mV, V4 is 45 mV and V5 is 40 mV. First, the minimum voltage level of the coupling signal $S_C$ is about 85 mV, which is far higher than any voltage (50 to 55 mV) falling within the predetermined reference voltage range R3 and is higher than V1. So, the first discharge signal UP2 is enabled, and the level adjusting circuit 230 outputs the adjusting current $I_{Adj}$ to adjust the DC level of the coupling signal $S_C$ according to the enabled first discharge signal UP2. After several periods have elapsed, the minimum voltage level of the coupling signal $S_C$ is lowered to the voltage, which is around the predetermined reference voltage range R3 but is still slightly higher than V2. Thus, the second discharge signal UP1 is enabled, and the level adjusting circuit 230 outputs the smaller adjusting current $I_{Adj}$ to finely adjust the DC level of the coupling signal $S_C$ according to the enabled second discharge signal UP1. As shown in FIG. 6, when the second discharge signal UP1 is enabled, the decreasing speed of the minimum voltage level of the coupling signal $S_C$ is eased. After several periods have elapsed again, the minimum voltage level of the coupling signal $S_C$ falls within the predetermined reference voltage range R3, so the locking signal Lock is enabled. At this time, the synchronous signal SYNC may be successfully separated through the synchronous signal separating circuit 240.

In the above-mentioned embodiment, the level determining circuit 220 including four comparators is described. However, the invention is not limited thereto.

The device for separating the synchronous signal in the video signal according to the embodiment of the invention can adjust the DC level of the AC-coupled video signal, compare the received and AC-coupled video signal with the default reference voltage, and record the reference voltage range corresponding to the AC-coupled minimum voltage level in the minimum value recorder. The level adjusting circuit adjusts the DC level of the coupling signal according to the record recorded in the minimum value recorder. In addition, the level adjusting circuit may have the charge current source and the discharge current source for providing two different currents so that the DC level of the coupling signal can be adjusted more precisely. The device of the invention can possibly eliminate the problem of the imprecise operation due to the error of the circuit manufacturing process, and can reduce the phenomenon of the unstable circuit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for receiving a video signal, which comprises a synchronous signal and a data signal, and separating the synchronous signal in the video signal, the device comprising:
    a capacitor for receiving the video signal and performing AC coupling according to the video signal to obtain a coupling signal;
    a level determining circuit for receiving the coupling signal, comparing a voltage level of the coupling signal with a plurality of reference voltages defining a plurality of reference voltage ranges, one of which is a predetermined reference voltage range, and outputting an adjusting signal according to the reference voltage range corresponding to a minimum voltage level of the coupling signal in a predetermined time period;
    a level adjusting circuit for receiving the adjusting signal and thus adjusting a DC level of the coupling signal until the minimum voltage level of the coupling signal is within the predetermined reference voltage range;
    a synchronous signal separating circuit for separating the synchronous signal from the coupling signal according to a separating reference voltage when the minimum voltage level of the coupling signal is within the predetermined reference voltage range;
    an oscillator for providing an operation control signal for the device; and
    a period control circuit for down-sampling the operation control signal to generate a first period signal and a second period signal, wherein the level determining circuit determines the reference voltage range corresponding to the voltage level of the coupling signal according to the operation control signal and determines the predetermined time period according to the first period signal, and a length of time that the current sources are enabled is determined by an enabling time of the second time period signal.

2. The device according to claim 1, wherein the level determining circuit comprises a reference voltage generator for generating the reference voltages and the separating reference voltage whose magnitude is neighboring the predetermined reference voltage range.

3. The device according to claim 1, wherein the adjusting signal enables the level adjusting circuit to lower the DC level of the coupling signal when the minimum voltage level of the coupling signal is greater than the predetermined reference voltage range, and enables the level adjusting circuit to increase the DC level of the coupling signal when the minimum voltage level of the coupling signal is smaller than the predetermined reference voltage range.

4. The device according to claim 1, wherein the level determining circuit comprises:
    a comparing circuit comprising a plurality of comparators having first terminals for respectively receiving the coupling signal, and second terminals for respectively receiving the reference voltages; and
    a minimum value recorder for determining one of the reference voltage ranges that corresponds to the voltage level of the coupling signal according to output signals of the comparators, recording the reference voltage range corresponding to the minimum voltage level of the coupling signal in the predetermined time period and thus outputting the adjusting signal.

5. The device according to claim 1, wherein the level adjusting circuit has a plurality of current sources, which are controlled according to the adjusting signal to adjust the DC level of the coupling signal until the minimum voltage level of the coupling signal is within the predetermined reference voltage range.

6. The device according to claim 5, wherein the current sources comprises:
    a fine-tuning discharge current source for lowering the DC level of the coupling signal;
    a fine-tuning charge current source for increasing the DC level of the coupling signal;
    a coarse-tuning discharge current source for lowering the DC level of the coupling signal; and
    a coarse-tuning charge current source for increasing the DC level of the coupling signal, wherein:
    the adjusting signal selectively enables one of the fine-tuning discharge current source, the fine-tuning charge current source, the coarse-tuning discharge current source and the coarse-tuning charge current source according to the reference voltage range corresponding to the minimum voltage level of the coupling signal; and
    the adjusting signal disables the fine-tuning discharge current source, the fine-tuning charge current source, the coarse-tuning discharge current source and the coarse-tuning charge current source when the minimum voltage level of the coupling signal is within the predetermined reference voltage range.

7. The device according to claim 1, wherein the synchronous signal separating circuit comprises:
    a separating comparator for comparing the voltage level of the coupling signal with the separating reference voltage and thus outputting the synchronous signal, wherein the separating reference voltage is higher than any voltage within the predetermined reference voltage range.

8. The device according to claim 1, wherein:
the level adjusting circuit has a plurality of current sources, which are controlled according to the adjusting signal to adjust the DC level of the coupling signal until the minimum voltage level of the coupling signal is within the predetermined reference voltage range; and
the period control circuit down-samples the operation control signal to generate a second period signal, the current sources are enabled for time lengths determined by an enabling time of the second period signal.

9. The device according to claim 1, wherein a frequency of each of the first period signal and the second period signal is lower than a frequency of the synchronous signal.

10. A method of separating a video signal in a synchronous signal, the method being adapted to a display device, which receives the video signal comprising the synchronous signal and a data signal, the method comprising the steps of:
(a) performing AC coupling according to the video signal to obtain a coupling signal;
(b) comparing a voltage level of the coupling signal with a plurality of reference voltages defining a plurality of reference voltage ranges, one of which is a predetermined reference voltage range;
(c) generating an adjusting signal according to the reference voltage range corresponding to a minimum voltage level of the coupling signal in a predetermined time period;
(d) adjusting a DC level of the coupling signal according to the adjusting signal until the minimum voltage level of the coupling signal is within the predetermined reference voltage range; (e) separating the synchronous signal from the coupling signal according to a separating reference voltage when the minimum voltage level of the coupling signal is within the predetermined reference voltage range; (f) generating an operation control signal;
(g) down-sampling the operation control signal to generate a first period signal and a second period signal;
(h) judging the reference voltage range corresponding to the voltage level of the coupling signal according to the operation control signal; and
(i) determining the predetermined time period according to a period of the first period signal,
wherein a plurality of current sources are enabled for lengths of time associated with an enabling time of the second period signal.

11. The method according to claim 10, wherein the DC level of the coupling signal is lowered when the minimum voltage level of the coupling signal is higher than any voltage within the predetermined reference voltage range, and the DC level of the coupling signal is increased when the minimum voltage level of the coupling signal is lower than any voltage within the predetermined reference voltage range.

12. The method according to claim 10, wherein in the step (d), a plurality of current sources is controlled according to the adjusting signal to adjust the DC level of the coupling signal until the minimum voltage level of the coupling signal is within the predetermined reference voltage range.

13. The method according to claim 12, wherein:
the current sources comprise a fine-tuning discharge current source for lowering the DC level of the coupling signal, a fine-tuning charge current source for increasing the DC level of the coupling signal, a coarse-tuning discharge current source for lowering the DC level of the coupling signal, and a coarse-tuning charge current source for increasing the DC level of the coupling signal; and
in the step (d):
the adjusting signal selectively enables one of the fine-tuning discharge current source, the fine-tuning charge current source, the coarse-tuning discharge current source and the coarse-tuning charge current source according to the reference voltage range corresponding to the minimum voltage level of the coupling signal; and
the adjusting signal disables the fine-tuning discharge current source, the fine-tuning charge current source, the coarse-tuning discharge current source and the coarse-tuning charge current source when the minimum voltage level of the coupling signal is within the predetermined reference voltage range.

14. The method according to claim 10, wherein the separating reference voltage is higher than any voltage within the predetermined reference voltage range, and the separating reference voltage neighbors the predetermined reference voltage range.

15. The method according to claim 10, wherein a frequency of each of the first period signal and the second period signal is lower than a frequency of the synchronous signal.

* * * * *